F. HABERMAN.
Dust-Pan.
No. 218,259. Patented Aug. 5, 1879.
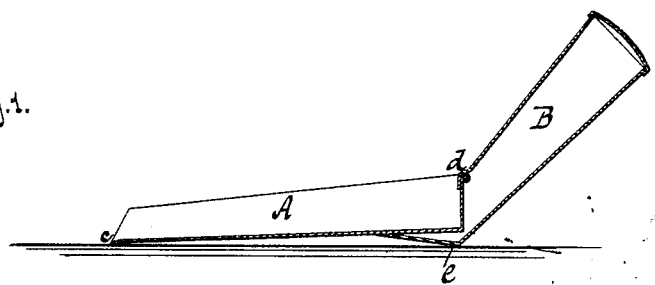
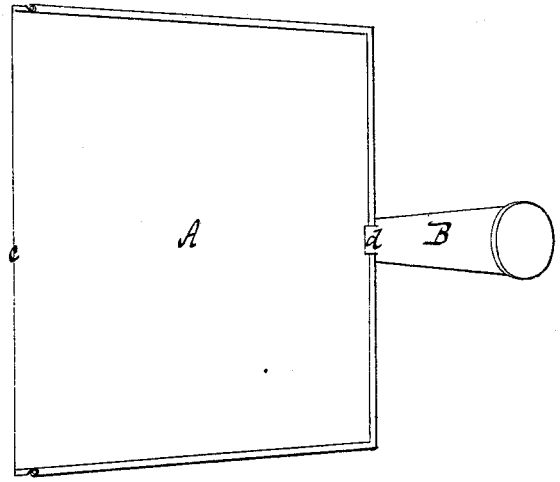
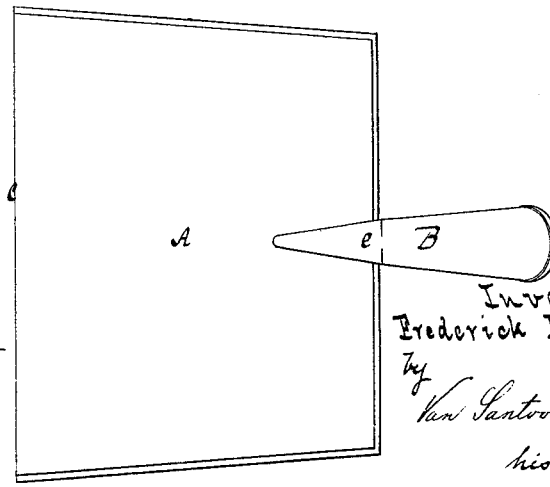
Witnesses
Otto Hufeland
William Miller
Inventor
Frederick Haberman
by
Van Santvoord & Hauff
his attys

UNITED STATES PATENT OFFICE.

FREDERICK HABERMAN, OF NEW YORK, N. Y.

IMPROVEMENT IN DUST-PANS.

Specification forming part of Letters Patent No. 218,259, dated August 5, 1879; application filed June 26, 1879.

*To all whom it may concern:*

Be it known that I, FREDERICK HABERMAN, of the city, county, and State of New York, have invented a new and useful Improvement in Dust-Pans, which improvement is fully set forth in the following specification, reference being had to the accompanying drawings, in which—

Figure 1 represents a longitudinal section of a pan embracing my invention. Fig. 2 is a top view thereof. Fig. 3 is an inverted plan view of the same.

Similar letters indicate corresponding parts.

My invention consists in the combination, with the body of a dust-pan, of a cylindrical handle formed of a single piece of sheet metal with a lip projecting therefrom, which is bent over the rear side of the body, and with a foot which extends under the body, both the lip and the foot being soldered or otherwise secured in their places on the body, so that the strongest possible joint is produced between the handle and body with the least amount of labor, and at the same time the body is adapted to stand in an inclined position, as hereinafter more fully set forth.

In the drawings, the letter A designates the body, and B the cylindrical handle, of my dust-pan.

The letter $d$ designates a lip, and $e$ a foot, which I form on or in one piece with the handle B, the latter as well as the body being of sheet metal.

I cut out and swage the handle B by suitable dies to form the lip $d$ and foot $e$, and bend the lip over the rear side of the pan-body, while I extend the foot under the body, as shown. In these positions I secure said lip and foot by solder or other suitable means, thereby firmly uniting the handle with the body.

I am aware that it is common to join the handle with the body of a dust-pan by means of a lip and foot made separate from the handle, and such is not within the scope of my invention.

By making the lip $d$ and foot $e$ in one piece with the handle I save the labor involved in securing these parts to the handle as well as to the body, as heretofore, and also, obviously, produce a stronger joint than by means of a lip and foot made separate from the handle.

The foot $e$ has a dual function—that is to say, besides serving to join the handle B to the body A it has the effect of raising the rear part of the body when the pan is placed on the floor, so that the body occupies an inclined position, and the sweeping of dust thereon is facilitated.

What I claim as new, and desire to secure by Letters Patent, is—

In combination with the body of a dust-pan, a cylindrical handle formed of a single piece of sheet metal with a lip projecting therefrom, which is bent over the rear upper edge of the body, and with a foot extending under the body at an angle to its bottom, both the lip and foot being soldered or otherwise secured in their places, substantially as and for the purposes specified.

In testimony that I claim the foregoing I have hereunto set my hand and seal this 23d day of June, 1879.

F. HABERMAN. [L. S.]

Witnesses:
 W. HAUFF,
 CHAS. WAHLERS.